United States Patent [19]

Trommer

[11] Patent Number: 4,909,363

[45] Date of Patent: Mar. 20, 1990

[54] UNIDIRECTIONAL NO-BACK DEVICE

[75] Inventor: William C. Trommer, Rockford, Ill.

[73] Assignee: Sundstrand Corporation, Rockford, Ill.

[21] Appl. No.: 61,713

[22] Filed: Jun. 15, 1987

[51] Int. Cl.$^4$ .............................................. F16D 67/02
[52] U.S. Cl. ..................................... 192/8 R; 188/134
[58] Field of Search ........................... 192/7, 8 R, 8 C; 188/134

[56] References Cited

U.S. PATENT DOCUMENTS

| | | | |
|---|---|---|---|
| 2,659,466 | 11/1953 | Ochtman | 192/8 R |
| 2,925,157 | 2/1960 | Davis | 192/8 R |
| 3,011,605 | 12/1961 | Hungerford, Jr. et al. | 192/8 C |
| 3,285,377 | 11/1966 | Rasmussen | 192/8 R |
| 3,596,740 | 8/1971 | Nau | 188/134 |
| 3,720,077 | 3/1973 | Jackson et al. | 192/56 R |
| 3,757,472 | 9/1973 | Rogakos | 192/8 R X |
| 3,981,186 | 9/1976 | Rauch et al. | 73/151 |
| 4,176,733 | 12/1979 | Twickler | 188/134 |
| 4,483,429 | 11/1984 | Tiedeman | 192/8 R |
| 4,579,201 | 4/1986 | Tiedeman | 192/8 C |
| 4,597,477 | 7/1986 | Miller | 192/8 R |

Primary Examiner—Leslie A. Braun
Assistant Examiner—Richard M. Lorence
Attorney, Agent, or Firm—Wood, Dalton, Phillips, Mason & Rowe

[57] ABSTRACT

A unidirectional no-back device having an input shaft and an output shaft and grounded releasable brake structure for holding the output shaft against rotation. A drive train between the input and output shafts has first and second ball and ramp structures. The first ball and ramp structure is operable upon rotation of the input shaft in either direction by a prime mover to release the brake structure and enable driving of the output shaft by the input shaft. The second ball and ramp structure is responsive to torque flow from rotation of the output shaft in one direction to release the brake structure to permit backdriving of the input shaft and prime mover from the output shaft and is inoperative in response to torque flowing in an opposite direction of rotation of the output shaft so as to not release the brake structure and thus preclude rotation of the output shaft.

11 Claims, 1 Drawing Sheet

UNIDIRECTIONAL NO-BACK DEVICE

FIELD OF THE INVENTION

This invention pertains to a unidirectional no-back device that will allow for the transmission of mechanical power from a prime mover to an output shaft in response to rotation by the prime mover of an input shaft which is rotating in either a forward or reverse direction If mechanical power is directed from the output shaft to the input shaft and prime mover, the unidirectional no-back device will prevent back driving of the prime mover in response to output shaft torque acting to rotate the output shaft in one direction while allowing back driving and torque flow from the output shaft to the prime mover when the torque applied to the output shaft acts to rotate the output shaft in the opposite direction. The unidirectional no-back device has particular utility as part of the actuating mechanism for aircraft flight control surfaces or other components powered by a prime mover and which should be able to return to a null position in the event power is lost to the prime mover during deployment of the control surface.

BACKGROUND OF THE INVENTION

Actuating mechanism for deployment and retraction of an aircraft flight control surface may have a no-back device incorporated therein to prevent any movement of the flight control surface other than obtained by operation of a prime mover for the actuating mechanism. A typical no-back device has releasable brake means associated with an output shaft and a drive train between an input shaft associated with the prime mover and the output shaft. This drive train has a ball and ramp structure operable in response to torque flow from the input shaft in either direction of rotation thereof to release the brake means and transmit torque to the output shaft. The no-back device assures that a flight control surface will remain in whatever position is established by operation of the prime mover. An example of such a no-back device is disclosed in Twickler Pat. No. 4,176,733, owned by the assignee of this application.

If power is lost to the prime mover during deployment of an aircraft flight control surface with the actuating mechanism having the no-back device described in the preceding paragraph, the aircraft flight control surface will remain in a position to which it has been moved by the prime mover prior to loss of power. The unidirectional no-back device disclosed herein precludes aerodynamic loading on the flight control surface from further deploying the flight control surface while enabling the flight control surface to retract to a null position under aerodynamic loading in a direction to exert the necessary force thereon and cause backdriving of the prime mover.

SUMMARY OF THE INVENTION

A primary feature of the invention is to provide a unidirectional no-back device which provides for bidirectional movement of a member derived from bidirectional operation of a prime mover and which precludes movement of the member in one direction in response to external force applied thereto while enabling back driving of the prime mover and movement of the member in response to external forces acting on the member urging it in the opposite direction.

Another feature of the invention is to provide a unidirectional no-back device usable as part of an actuating mechanism for a deployable member which is powered by a prime mover. In the event that power is lost to the prime mover during deployment of said member, the unidirectional no-back device will allow the member to retract to a null position by allowing the prime mover to be back driven. If, however, during a power off condition to the prime mover, the member should try and move to a further deployed position, the unidirectional no-back device will lock up and hold the member in position until such time as forces thereon cause the member to retract from its deployed position.

An exemplary embodiment of the invention achieves the features set forth above by having releasable brake means associated with an output shaft of the unidirectional no-back device. A first ball ramp structure in the drive train between an input shaft and the output shaft responds to a torque in excess of a preset level to release the brake means and enable driving of the output shaft by the input shaft. A second ball and ramp structure in the drive train is operable in one direction of torque flow from the output shaft to release the brake means and permit backdriving of the input shaft and a prime mover associated therewith from the output shaft while being inoperable against torque applied in the opposite direction by the output shaft to release said brake means.

An object of the invention is to provide a new and improved unidirectional no-back drive device.

Another object of the invention is to provide a unidirectional no-back device enabling both forward and reverse drive from the input side to a rotatable output shaft at the output side thereof while permitting backdriving from the output shaft to the input side in only one rotational directional comprising, an input shaft, an output shaft, releasable brake means associated with the output shaft and operable to prevent rotation of the output shaft, a drive train between said input and output shafts including means responsive to rotation of the input shaft to release said brake means, said output shaft being subject to backdriving in both forward and reverse directions of rotation, and means operable in response to rotational force applied to the output shaft in only one of said forward and reverse directions of rotation to release said brake means and enable torque flow to the input shaft.

Still another object of the invention is to provide a unidirectional no-back device as described in the preceding paragraph wherein the means operable in response to rotation of the input shaft and to the rotational force applied to the output shaft include first and second ball ramp structures operable to effect release of said brake means and with the construction enabling all reaction loads at the ball and ramp structure to be reacted into the output shaft and not into a housing for the device.

Still another object of the invention is to provide a unidirectional no-back device comprising, a housing, input and output shafts rotatably mounted in said housing, releasable brake means in said housing including a brake pack, a brake-loading ram engageable with aid brake pack, a stop drum adjacent said brake-loading ram, a disc spring stack positioned between said stop drum and the brake-loading ram, a first ball and ramp structure including a pair of opposed spaced-apart discs with one disc rotatable with the input shaft, a tubular intermediate shaft, the other of said discs being on said tubular intermediate shaft, said pair of discs having opposed ramps each having a central detent position and inclines extending oppositely therefrom toward the surface of the disc, and a ball associated with each of opposed ramps, said tubular intermediate shaft being translatable by the first ball and ramp structure in response to torque flow from the input shaft to engage and move the brake-loading ram against the force of the disc spring stack to release the brake means, a second ball and ramp structure having a pair of spaced-apart discs associated one with the output shaft and one with the brake-loading ram, said discs having opposed ramps, each of said ramps having a stop shoulder at one end thereof and an incline therefrom extending toward the surface of the disc, said stop shoulders of a pair of opposed ramps facing in opposite directions, and a ball between a pair of opposed ramps which is held against said stop shoulders in one direction of rotation of the output shaft and which can roll along said inclines in the opposite direction of output shaft rotation to separate said last-mentioned discs and urge said brake-loading ram in a direction to release said brake means.

DESCRIPTION OF THE PREFERRED EMBODIMENT

Figure 1:
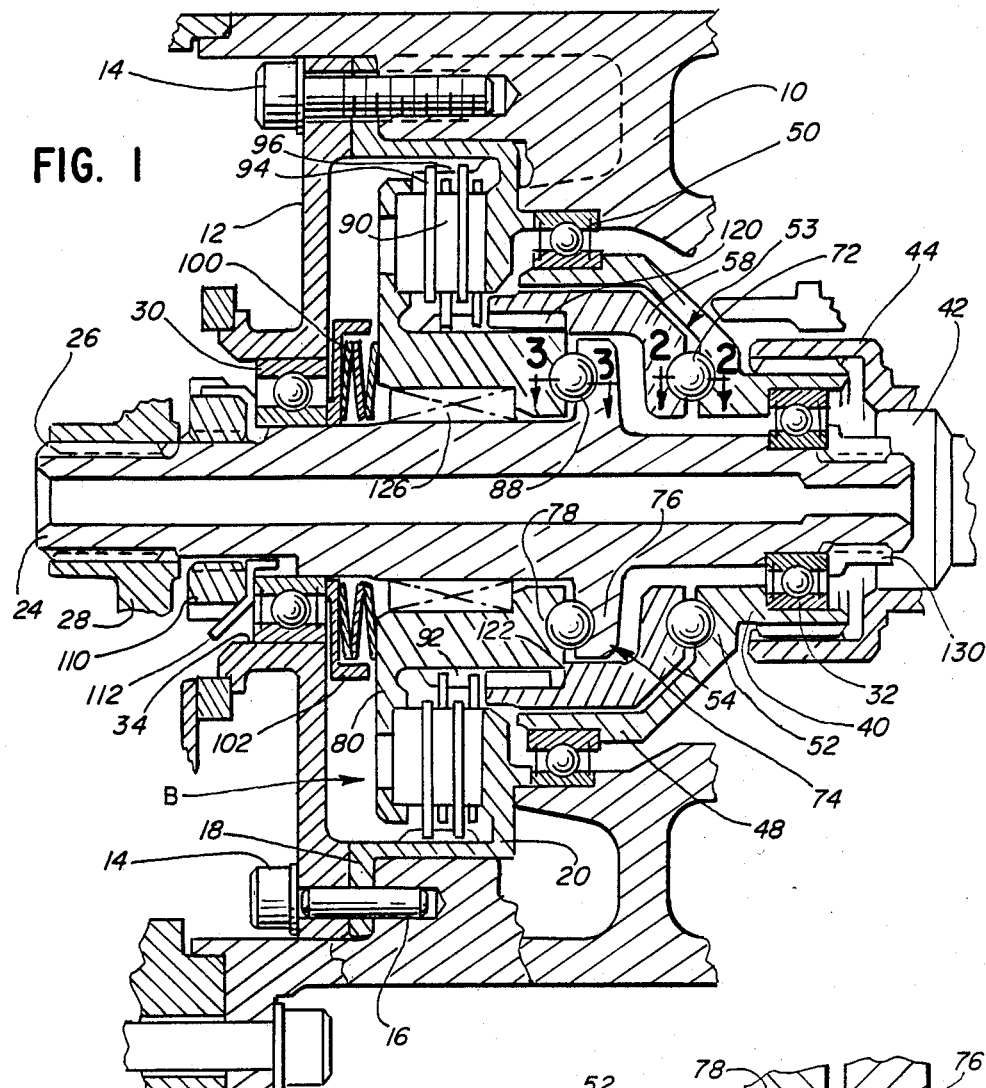
FIG. 1 is a central vertical section of the unidirectional no-back device.

The unidirectional no-back device has a generally cylindrical main housing 10 with one end thereof enclosed by an output end support cover 12 secured to the main housing by means of self-locking cap screws 14. A dowel pin 16 extends between the output end support cover 12 and the main housing 10 and extends through a flange 18 of a cup-shaped brake grounding drum 20 which reacts the torque of a releasable brake means, to be described, to the main housing 10.

An output shaft 24 extends outwardly of the output end support cover 12 and has a splined connection as indicated at 26 to a gear 28 of a gear mechanism (not shown) connectable to a member to be moved by a drive through the unidirectional no-back device.

The output shaft 24 is rotatably mounted by a pair of bearings 30 and 32. The bearing 30 is movable lengthwise in a bore 34 of the output end support cover 12.

An input shaft 40 surrounds an end of the output shaft 24 and mounts the outer race of the bearing 32. The input shaft is connectable to a prime mover and with the drive shaft 42 of a prime mover such as an electric motor having a tubular end 44 which is splined to the input shaft 40.

The input shaft 40 has an enlarged somewhat conical section terminating in a cylindrical section 48 which is rotatably supported by a bearing 50 between the cylindrical section and the main housing 10.

The input shaft 40 also has a part 52 thereof defining a disc of a first ball and ramp structure 53 with a second disc 54 of the first ball and ramp structure being formed as part of a secondary input shaft 58 of a generally tubular construction disposed within the input shaft 40 and surrounding the output shaft 24.

Figure 2:
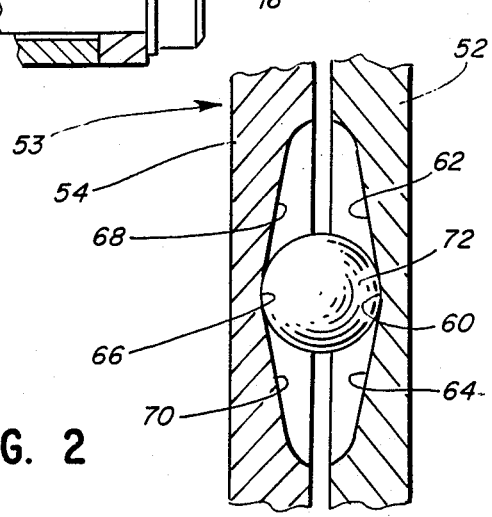
FIG. 2 is a fragmentary developed plan view of a first ball and ramp structure as taken generally along the line 2—2 in FIG. 1.
Figure 3:
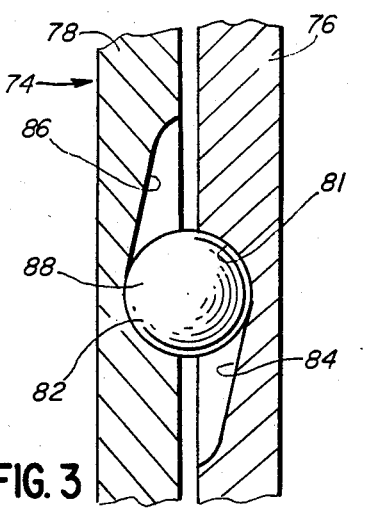
FIG. 3 is a fragmentary developed view of a second ball and ramp structure as taken generally along the line 3—3 in FIG. 3.

Each of the discs 52 and 54 has three ramps with an opposed pair seen in FIG. 2. Each of the ramps has a curvature along the length thereof and with the three ramps equally circumferentially spaced around the disc. A structure of this general type is shown in FIGS. 2 and 3 of the previously mentioned Twickler patent and disclosure thereof is incorporated herein by reference.

The ramps for the disc 52 are all of the same construction with one of the ramps being shown in FIG. 2. The ramp has a central detent position 60 with oppositely inclined surfaces 62 and 64 extending toward the surface of the disc. A ramp for the disc 54 has a central detent position 66 and oppositely inclined surfaces 68 and 70 extending toward the surface of the disc. Each pair of opposed ramps has a ball 72 positioned therebetween.

A second ball and ramp structure 74 has a first disc defined by a peripheral flange 76 on the output shaft and a second disc 78 formed as part of a brake loading ram 80. One component of the ball and ramp structure is shown particularly in FIG. 3 with there being three similar structure equally spaced circumferentially of the ball and ramp structure. Discs 76 and 78 have the respective oppositely facing stop shoulders 81 and 82 defining part of the ramp and with the remainder of the ramp having the inclined surfaces 84 and 86 which extend toward the surface of the discs. A ball 88 is positioned between the ramps.

A releasable brake means "B" includes the brake-loading ram 80 and the brake grounding drum 20. Interposed therebetween is a brake pack including friction brake discs 90 having a splined connection with the brake-loading ram 80 including a spline 92 on the brake-loading ram. Separator plates 94 interleaved with the friction brake discs are connected to a spline on the brake grounding drum 20.

The friction brake discs and separator plates are urged into compressive engagement by spring force urging the brake-loading ram 80 toward the brake grounding drum 20. This force is derived from a stack of disc springs 100 held in position by a cup-shaped stop drum 102 and which are compressively engaged between the stop drum and a face of the brake-loading ram 80.

The force exerted by the springs against the brake pack can be varied by adjustment of the stop drum axially of the output shaft 24. As viewed in FIG. 1, the force of the springs can be increased by moving the stop drum 102 to the right and this movement is achieved by shift of the bearing 30 in the bore 34. Shift of the bearing is achieved by adjustment of a lock nut 110 which is threaded on the output shaft 24 to move a lock washer 112 positioned between the lock nut and the bearing 30. The stop drum 102 being cup-shaped limits the movement of the brake-loading ram 80 away from the brake grounding drum 20 to prevent a disc spring stack from going to solid height which could overstress the disc springs 100 (or at least alter their useful lives).

The tubular secondary input shaft 58 has a splined connection with the brake-loading ram as indicated at 120 which enables relative axial movement therebetween while interconnecting these parts for rotation together. Additionally, a shoulder 122 on the interior of the secondary input shaft 58 abuts an end of the brake-loading ram 80 whereby movement of the secondary input shaft 58 towards the left, as viewed in FIG. 1, will cause the shoulder to force the brake-loading ram 80 to translate toward the left against the force of the disc springs 100 and release the brake means.

A bearing journal 126 between the brake-loading ram 80 and the output shaft 24 allows for backlash to be removed between the brake-loading ram 80 and the output shaft 24 when the brake-loading ram is moved in the direction to release the brake and torque is transmitted to the output shaft 24. This backlash results from free play between the balls 88 of the second ramp and ball structure and the inclines 84 and 86 of the discs prior to torque transmittal through these components. The bearing journal also acts to allow relative rotation between the brake-loading ram 80 and the output shaft 24 during the backdriving mode when the brake "B" is being released and the balls 88 are moving up the ramps 84 and 86. The disc springs 100 do not take up the clearance between the balls and ramps 52, 53, and 72.

The input shaft 40 is allowed to rotate by the bearings 32 and 50 but is connected to the bearings by shoulder engagement therewith to preclude translation thereof. A lock nut 130 threaded on an end of the output shaft 24 captures the bearing 32 on the output shaft so that the separating force on the input shaft due to the balls 72 rolling up the inclines of the ramps of the discs 52 and 54 against the preload of the disc springs 100 is reacted back to the output shaft 24 and not to the main housing 10.

In setting up the unidirectional no-back device for operation, the disc springs are preloaded to a value corresponding to the required holding torque of the releasable brake means. The angle of inclination of all of the ramps of the first and second ball and ramp structure is selected based on the preload of the disc springs and torque at which the first and second ball and ramp structures are designed to overcome the preload. This preload is set by adjustment of the lock nut 110 and lock washer 112 as previously described.

In operation, when the prime mover inputs torque to the input shaft 40, there is a common torque between the input shaft and the secondary input shaft 58 which is being held by the releasable brake means. When the torque is sufficient to cause the balls 72 to move along the inclines of the ramps of the discs 52 and 54 an axial force is created which acts through the shoulder 122 on the secondary input shaft 58 to urge the brake-loading ram 80 to a brake release position. There can then be torque transmittal from the input shaft to the output shaft 24 through a drive train including the secondary input shaft 58, the first ball and ramp structure, the brake-loading ram 80 and the second ball and ramp structure having the disc 76 thereof integral with the output shaft. This operation can occur in either forward or reverse direction of the input shaft by the prime mover.

If power is lost to the prime mover during the normal operation of transmitting torque through the unidirectional no-back device, the device functions to permit back driving of the prime mover from the output shaft when forces acting on the output shaft tend to rotate the output shaft in one direction but which preclude back-driving of the prime mover when the forces tend to rotate the output shaft in the opposite direction. This operation is achieved by use of the second ball and ramp structure. As seen in FIG. 3, if there is a force tending to rotate the disc 76 integral with the output shaft 24 in a downward direction, the ball 88 is captured between the stop shoulders 81 and 82 and there are no separating forces acting to separate the discs 76 and 78 and cause release of the brake means. When the force acting on the output shaft 24 is acting in a direction to rotate the disc 76 in an upward direction, as viewed in FIG. 3, the ball 88 is free to move along the inclines 84 and 86 to achieve separating movement of the discs which results in translation of the brake-loading ram 80 against the action of the disc springs 100 to release the brake. Output shaft torque can flow to the input shaft through the second ball and ramp structure, the brake-loading ram 80, the spline connection 120, the secondary input shaft 58 and the first ball and ramp structure to the input shaft 40 which is connected to the prime mover.

From the foregoing, it will be evident that the basic operation of the unidirectional no-back device is derived from the utilization of first and second ball ramp structures in a drive train to release brake means connected between a grounding element as defined by the main housing and the output shaft 24. The first ball and ramp structure has the discs thereof translating relative to each other due to the relative rotation between them when mechanical power is received from the prime mover. This translational movement of the discs is imparted to the brake-loading ram 80 causing the brake means to release and permit torque transmission to the output shaft 24. The spherical grooves defining the ramp inclined sections 62, 64, 68 and 70 incline in both directions from the ball detent positions 60 and 66 whereby torque received from the prime mover in either direction of rotation of the input shaft will allow for torque to be transmitted to the output shaft.

When the torque flow through the unidirectional no-back device is from the output to the input side, either of two things can happen. If the reverse torque flow is in the brake release direction, the balls 88 of the second ball and ramp structure will be caused to roll up the incline 84 and 86 and cause translation of the brake-loading ram 80 to release the brake means and allow torque to pass through the device and back-drive the prime mover. However, if the first torque flow is in the grounding direction of rotation, then the unidirectional no-back device will lock-up since the stop shoulders 81 and 82 of the discs 76 and 78 will preclude any movement of the balls 88 and therefore, there will be no separation between the discs 76 and 78 and the brake will not be released. In this direction of rotation, there is no torque gain effect and consequently, there is not enough torque available to drag the brake to cause rotation.

As will be evident, the unidirectional no-back device allows for the deployment and retraction of an aircraft flight control surface while being powered by a prime mover. In the event that power is lost to the prime mover during control surface deployment, the device will allow the control surface to retract to a null position by allowing the prime mover to be back driven. However, if during the power off condition of the prime mover the aerodynamic loading on the control surface should try and further deploy the control surface, the device will lock up and hold the control surface in position until the aerodynamic load direction reverses causing the control surface to retract. The unidirectional no-back device can also be used in other applications where a deployed member should be free to go to a neutral position in the event of loss of power.

I claim:

1. A unidirectional no-back device to enable transmission of torque from an input shaft to an output shaft in both directions of input shaft rotation while permitting backdriving to the input shaft from the output shaft in only one direction of output shaft rotation and having an input shaft, an output shaft, releasable brake means for holding the output shaft against rotation, and a drive train between said input and output shafts including means defining a ball and ramp structure operable to release said brake means in response to rotation of the input shaft in either the forward or reverse direction of rotation, the improvement comprising, means defining a second ball and ramp structure in the drive train and operable in only one direction of rotation of the output shaft to release said brake means and permit backdriving of the input shaft.

2. A unidirectional no-back device as defined in claim 1 wherein said second ball and ramp structure includes a pair of opposed discs operatively connected one to the input shaft and one to the output shaft, each of said discs having a plurality of opposed inclined ramps, a plurality of balls with one ball associated with each pair of opposed ramps, and said ramps each having a stop shoulder at one end thereof with the stop shoulders of opposed ramps facing in opposite directions whereby rotation of the output shaft in one direction will cause the balls to roll along the inclined ramps to separate the discs, and rotation of the output shaft in an opposite direction will cause the balls to lock against said stop shoulders and not separate the discs.

3. A unidirectional no-back device having drive input and drive output sides and enabling both forward and reverse drive from the drive input side to a rotatable output shaft at the drive output side thereof while permitting backdriving from the output shaft to the drive input side in only one rotational direction comprising, a housing, an input shaft, an output shaft, releasable brake means associated with the output shaft and operable to prevent rotation of the output shaft, said releasable brake means comprising a brake pack with brake members spring-loaded into frictional engagement, a drive train between said input and output shafts including means responsive to rotation of the input shaft to release said brake means, said output shaft being subject to backdriving in both forward and reverse directions of rotation, means operable in response to rotational backdriving force applied to the output shaft in only one of said forward and reverse directions of rotation to release said brake means and enable torque flow to the input shaft, means for grounding said releasable brake means to said housing, and means operable externally of the housing for varying the spring-loading of the brake pack to set a predetermined holding torque for the releasable brake means.

4. A unidirectional no-back device having drive input and drive output sides and enabling both forward and reverse drive from the drive input side to a rotatable output shaft at the drive output side thereof while permitting backdriving from the output shaft to the drive input side in only one rotational direction comprising, an input shaft, an output shaft, releaseable brake means associated with the output shaft and operable to prevent rotation of the output shaft, a drive train between said input and output shafts including means responsive to rotation of the input shaft to release said brake means, said output shaft being subject to backdriving in both forward and reverse directions of rotation, means operable in response to rotational force applied to the output shaft in only one of said forward and reverse directions of rotation to release said brake means and enable torque flow to the input shaft and wherein said means responsive to said rotation of the input shaft to release said brake means comprises a ball and ramp structure having a pair of discs with opposed ramps each having a central recess defining a detent position and inclines extending oppositely therefrom toward the surface of the discs, and a ball associated with each pair of opposed ramps.

5. A unidirectional no-back device having drive input and drive output sides and enabling both forward and reverse drive from the drive input side to a rotatable output shaft at the drive output side thereof while permitting backdriving from the output shaft to the drive input side in only one rotational direction comprising, an input shaft, an output shaft, releasable brake means associated with the output shaft and operable to prevent rotation of the output shaft, a drive train between said input and output shafts including means responsive to rotation of the input shaft to release said brake means, said output shaft being subject to backdriving in both forward and reverse directions of rotation, means operable in response to rotational force applied to the output shaft in only one of said forward and reverse directions of rotation to release said brake means and enable torque flow to the input shaft and wherein said means operable in response to rotational force applied to the output shaft comprises a ball and ramp structure having a pair of spaced-apart discs with opposed ramps, each of said ramps having a stop shoulder at one end thereof and an incline therefrom extending toward the surface of the disc, said stop shoulders of a pair of opposed ramps facing in opposite directions, and a ball between a pair of opposed ramps which is held against said stop shoulders in one direction of rotation of the output shaft and which can roll along said inclines in the opposite direction of output shaft rotation.

6. A unidirectional no-back device having drive input and drive output sides and enabling both forward and reverse drive from the drive input side to a rotatable output shaft at the drive output side thereof while permitting backdriving from the output shaft to the drive input side in only one rotational direction comprising, an input shaft, an output shaft, releasable brake means associated with the output shaft and operable to prevent rotation of the output shaft, a drive train between said input and output shafts including means responsive to rotation of the input shaft to release said brake means, said output shaft being subject to backdriving in both forward and reverse directions of rotation, means operable in response to rotational force applied to the output shaft in only one of said forward and reverse directions of rotation to release said brake means and enable torque flow to the input shaft, said means responsive to said rotation of the input shaft to release said brake means comprising a first ball and ramp structure having a pair of discs with opposed ramps which have a central recess and incline oppositely therefrom toward the surface of the discs, and a ball associated with each pair of opposed ramps; and said means operable in response to rotational force applied to the output shaft comprises a second ball and ramp structure having a pair of spaced-apart discs with opposed ramps, each of said last-mentioned ramps having a stop shoulder at one end thereof and an incline therefrom extending toward the surface of the disc, said stop shoulders of a pair of opposed ramps facing in opposite directions, and a ball between a pair of the last-mentioned opposed ramps which is held against said stop shoulders in one direction of rotation of the output shaft and which can roll along said inclines in the opposite direction of output shaft rotation.

7. A unidirectional no-back device comprising, a housing, input and output shafts rotatably mounted in said housing, releasable brake means in said housing including a brake pack, a brake-loading ram engageable with said brake pack, a stop drum adjacent said brake-loading ram, a disc spring stack positioned between said stop drum and the brake-loading ram, a first ball and ramp structure including a pair of opposed spaced-apart discs with one disc rotatable with the input shaft, a tubular intermediate shaft, the other of said discs being on said tubular intermediate shaft, said pair of discs having opposed ramps each having a central detent position and inclines extending oppositely therefrom toward the surface of the disc, and a ball associated with each of opposed ramps, said tubular intermediate shaft being translatable by the first ball and ramp structure in response to torque flow from the input shaft to engage and move the brake-loading ram against the force of the disc spring stack to release the brake means, a second ball and ramp structure having a pair of spaced-apart discs associated one with the output shaft and one with the brake-loading ram, said discs having opposed ramps, each of said ramps having a stop shoulder at one end thereof and an incline therefrom extending toward the surface of the disc, said stop shoulders of a pair of opposed ramps facing in opposite directions, and a ball between a pair of opposed ramps which is held against said stop shoulders in one direction of rotation of the output shaft and which can roll along said inclines in the opposite direction of output shaft rotation to separate said last-mentioned discs and urge said brake-loading ram in a direction to release said brake means.

8. A unidirectional no-back device as defined in claim 7 including means for adjusting the preload of said disc spring stack.

9. A unidirectional no-back device as defined in claim 8 wherein said means for adjusting the preload of said disc spring stack includes a bearing for said output shaft abutting said stop drum, a locknut and lockwasher on said output shaft for shifting said bearing axially of said output shaft, and a bore in an end cover of the housing in which said bearing is mounted.

10. A unidirectional no-back device as defined in claim 7 wherein each of said ball and ramp structures has three balls which are circumferentially equally spaced.

11. A unidirectional no-back device comprising, an output shaft subject to backdriving in both forward and reverse directions, releasable brake means for holding the output shaft against rotation, an input shaft, a drive train between said input and output shafts, means including a first ball and ramp structure in said drive train and responsive to a predetermined torque flow derived from rotation of the input shaft to release said brake means and permit rotation of the output shaft, and means including a second ball and ramp structure in said drive train operable in response to a predetermined torque flow derived from backdriving the output shaft in only one of said forward and reverse directions to release said brake means and permit torque flow to the input shaft.

* * * * *